(12) United States Patent
Krohn

(10) Patent No.: US 9,800,336 B2
(45) Date of Patent: Oct. 24, 2017

(54) ACTIVITY DIODES AND REFLECTIVE HOUSINGS

(71) Applicant: Napatech A/S, Søborg (DK)

(72) Inventor: Sune Graves Krohn, Søborg (DK)

(73) Assignee: Napatech A/S, Søborg (DK)

( * ) Notice: Subject to any disclaimer, the term of this patent is extended or adjusted under 35 U.S.C. 154(b) by 0 days.

(21) Appl. No.: 15/114,307

(22) PCT Filed: Jan. 8, 2015

(86) PCT No.: PCT/EP2015/050224
§ 371 (c)(1),
(2) Date: Jul. 26, 2016

(87) PCT Pub. No.: WO2015/110289
PCT Pub. Date: Jul. 30, 2015

(65) Prior Publication Data
US 2017/0005730 A1    Jan. 5, 2017

(30) Foreign Application Priority Data

Jan. 27, 2014  (EP) .................................... 14152660

(51) Int. Cl.
*H04B 10/00* (2013.01)
*H04B 10/116* (2013.01)
*H01R 13/717* (2006.01)
*H01R 13/73* (2006.01)
*H04B 10/50* (2013.01)

(52) U.S. Cl.
CPC ....... *H04B 10/116* (2013.01); *H01R 13/7172* (2013.01); *H01R 13/7175* (2013.01); *H01R 13/73* (2013.01); *H04B 10/503* (2013.01); *H01R 2201/04* (2013.01)

(58) Field of Classification Search
USPC ............... 398/135–139; 439/490; 385/77–94
See application file for complete search history.

(56) References Cited

U.S. PATENT DOCUMENTS

| | | | | |
|---|---|---|---|---|
| 4,379,606 A * | 4/1983 | Clark | ..................... | H05K 5/026 439/374 |
| 4,386,818 A * | 6/1983 | Millhimes | ............ | H01R 13/717 439/483 |
| 5,741,152 A * | 4/1998 | Boutros | ............... | H01R 13/717 439/490 |
| 5,790,041 A * | 8/1998 | Lee | ...................... | H01R 13/713 340/815.42 |
| 5,885,100 A * | 3/1999 | Talend | ................. | G02B 6/4292 439/490 |
| 6,159,037 A * | 12/2000 | Madsen | ............. | H01R 13/6691 439/488 |
| 6,241,550 B1* | 6/2001 | Laity | .................. | H01R 13/7172 439/490 |

(Continued)

FOREIGN PATENT DOCUMENTS

EP           0945933           9/1999
WO     WO2014009466           1/2014

*Primary Examiner* — Agustin Bello
(74) *Attorney, Agent, or Firm* — McHale & Slavin, P.A.

(57) ABSTRACT

A network card or the like with two or more connectors having reflecting sides, where a light emitter is positioned between or behind the connectors and emit light toward the reflecting sides which act as a wave guide and guide the light to an opening between the connectors and toward the surroundings.

6 Claims, 1 Drawing Sheet

(56) References Cited

U.S. PATENT DOCUMENTS

| | | | | |
|---|---|---|---|---|
| 6,431,765 | B1* | 8/2002 | Chen | G02B 6/4277 385/139 |
| 6,457,992 | B2* | 10/2002 | Posey | H01R 13/60 439/131 |
| 6,483,712 | B1* | 11/2002 | Oliphant | G06F 1/1616 361/736 |
| 7,101,219 | B1* | 9/2006 | Huang | H01R 13/6641 439/490 |
| 7,137,743 | B2* | 11/2006 | Graham | H01R 13/7172 385/114 |
| 7,194,183 | B2* | 3/2007 | Thornton | G02B 6/0001 385/139 |
| 7,670,170 | B2* | 3/2010 | Henry | H01R 13/7172 439/490 |
| 8,002,577 | B1* | 8/2011 | Sun | H01R 13/7172 439/344 |
| 8,135,282 | B2* | 3/2012 | Hosking | H04B 10/40 398/135 |
| 8,226,284 | B2* | 7/2012 | Markyvech | B60L 3/0069 320/109 |
| 8,390,993 | B1 | 3/2013 | Wilson et al. | |
| 8,861,972 | B2* | 10/2014 | Hosking | H04B 10/40 398/135 |
| 9,028,122 | B2* | 5/2015 | Tuchrelo | H01R 13/7175 362/253 |
| 9,160,118 | B2* | 10/2015 | Tuchrelo | H01R 13/7175 |
| 9,252,882 | B2* | 2/2016 | Chien | G02B 6/4277 |
| 9,281,636 | B1* | 3/2016 | Schmitt | H01R 13/7175 |
| 9,608,377 | B1* | 3/2017 | Phillips | H01R 13/646 |
| 2002/0009910 | A1* | 1/2002 | Posey | H01R 13/60 439/131 |
| 2004/0071410 | A1* | 4/2004 | Ma | H01R 13/6641 385/88 |
| 2004/0170016 | A1 | 9/2004 | Pellegrino | |
| 2004/0181367 | A1 | 9/2004 | Nguyen et al. | |
| 2005/0032415 | A1* | 2/2005 | Sakamoto | H01R 13/641 439/490 |
| 2005/0063647 | A1* | 3/2005 | Thornton | G02B 6/0001 385/89 |
| 2005/0124209 | A1* | 6/2005 | Currie | H01R 13/7172 439/490 |
| 2006/0093379 | A1* | 5/2006 | Aronson | H04B 10/0775 398/208 |
| 2006/0286856 | A1* | 12/2006 | Sakamoto | H01R 13/641 439/490 |
| 2008/0220645 | A1* | 9/2008 | Feldman | H01R 13/641 439/490 |
| 2009/0290838 | A1 | 11/2009 | Lin et al. | |
| 2010/0028014 | A1* | 2/2010 | Hosking | H04B 10/40 398/135 |
| 2010/0054734 | A1* | 3/2010 | Hosking | H04B 10/2503 398/25 |
| 2010/0111476 | A1* | 5/2010 | Shirk | G02B 6/0008 385/53 |
| 2010/0311270 | A1* | 12/2010 | Fukuda | H01R 13/641 439/490 |
| 2012/0083156 | A1* | 4/2012 | Fogg | H01R 13/6587 439/607.25 |
| 2014/0072311 | A1* | 3/2014 | Giziewicz | G02B 6/4214 398/135 |
| 2017/0005730 | A1* | 1/2017 | Krohn | H01R 13/7172 |

* cited by examiner

ACTIVITY DIODES AND REFLECTIVE HOUSINGS

CROSS REFERENCE TO RELATED APPLICATIONS

This is a national stage filing in accordance with 35 U.S.C. §371 of PCT/EP2015/050224, filed Jan. 8, 2015, which claims the benefit of the priority of European Patent Application No. 14152660.8, filed Jan. 27, 2014, the contents of each are incorporated herein by reference.

Usually, when multiple communication connections (such as network connectors) are provided on a computer card (such as a PCI card), activity diodes are desired to display communication activity over the connection. Different types of cards may be seen in WO2014/009466, US2009/290838, US2002/009910, U.S. Pat. No. 8,390,993, EP0945933, US2004/170016, US2004/181367 and US2005/063647.

However, as these cards may be oriented differently (vertically/horizontally), an activity diode may be obscured by the connector/cable seen from a usual direction of viewing of an operator, and especially in the situation where multiple connectors are positioned at close distance. Thus, multiple diodes may be desired for each connector. This becomes problematic.

Another problem is seen in e.g. PCI cards where the PCB is not allowed to extend to the connector ends, whereby providing LEDs at those positions require the LEDs having long connector legs or other manners are used for having the diodes at such extended positions.

A first aspect of the invention relates to a communication element comprising two communication connectors and a light emitting element, wherein:

- each communication connector comprises a housing having a radiation reflecting portion and an engagement portion configured to engage a communication element,
- the communication connectors are positioned adjacent to each other with the reflecting portions facing each other and defining there between an opening,
- the light emitting element being positioned so as to be able to emit radiation toward at least a portion of one of the reflecting portions and toward the opening,
- the positions of the light emitting element, the opening and the reflecting portions being so, when projected on to a straight line, at least part of the reflecting portions are provided between the light emitting element and the opening.

In this context, a communication element may be a computer, PC, server or the like configured to communicate with other computers/PCs/servers, such as via a network and/or a number of network elements, such as switches, routers and the like.

Naturally, the communication element, if not an integral part of a computer/PC/server, may be a replaceable or removable part thereof, such as a standard PCI card or PCMCIA card having dimensions fulfilling a desired standard, for example, and having a communication port or connector configured to communicate with other parts of the computer/PC/server. Such cards have predetermined dimensions and plugs for engagement with standard slots and connectors in the PC/server.

A further alternative is a separate element communicating either completely with the surroundings via the communication connectors or which has further connectors—or antennas—for communicating with other elements, such as computers, servers or PCs, such as via a network.

If desired, the data or information received or transmitted may be handled by further elements of the communication element, if desired. The communication element thus may comprise further circuits, such as MACS, NICs, switches, storage, processors or the like.

The communication may be any type of communication, wired (electrical wires and/or optical cables) and/or wireless (WiFi, Bluetooth, InfraRed, Radio waves, or the like) and may be performed on any platform and using any protocol (Ethernet, ATM, or the like).

Two or more connectors are provided. A connector is an element which is configured or able to physically engage a communication element, so that data may be communicated between the communication element and the connector. Typically, a connector/communication element assembly is an assembly of two corresponding plugs or connectors, such as a male and female RJ45 connector and USB connectors or plugs for e.g. gigabit Ethernet. Also, the connector/communication element may be configured to exchange or transfer optical signals, such as SFPx/QSFPx/CFPx connectors/cages or the like.

Naturally, the connectors may be the same in type and/or size or may be different.

The engagement may be a physical engagement, usually an engagement which may be broken and re-engaged.

During the engagement, data, power and/or signals may be interchanged by the communication connector and the communication element, such as if electrical conductors thereof engage or optical conductors thereof are aligned with each other.

The light emitting element preferably is configured to or able to emit visible light. The light emitted may be of a single colour or within an invariable wavelength interval, or the light emitting element may be configured to or able to emit light of different colours or within different wavelength intervals, such as within non-overlapping wavelength intervals, at different points in time. Then, the light emitting element may be controllable not only with respect to light intensity but also colour.

The housing, often called a cage, of a connector may be any structure. Typically, the housing comprises therein electrical conductors and/or optical conductors for transferring data to the communication element or receiving data therefrom. The engagement portion thus often comprises one or more exposed electrical connectors and/or exposed parts of optical conductors.

The housing may also therein or thereon comprise engaging elements, such as snap elements, threads or the like, for engaging corresponding elements on the communication element. Alternatively, engagement may be obtained simply by friction. The engaging portion may also comprise such engaging elements if desired.

Presently the connectors preferably form female connectors capable of receiving therein the communication elements being male connectors. The engagement portion then is a concave portion of the connector.

The radiation reflecting portion may have any desired size. Preferably, the reflecting portion of one or both housing(s) covers at least 50% of a surface of that housing facing the other housing. This percentage may be 50% of the surface when projected on to a plane perpendicular to a straight line between the two reflecting surfaces. This percentage may be even higher, such as at least 60%, at least 70%, at least 80%, at least 90% of the surface area.

In one situation, the housings are box-shaped or rectangular parallelepiped housings, usually with rounded corners, having plane, parallel sides, where the reflecting surfaces are surfaces of the plane, parallel sides facing each other.

In this respect, any portion or percentage of the radiation or light may be reflected when impacting or impinging on a reflective portion. This percentage may be as low as 1% but preferably is at least 10%, such as at least 20%, such as at least 30%, such as at least 40%, such as at least 50%, such as at least 60%, such as at least 70%, such as at least 80% of incident radiation at at least a predetermined wavelength or wavelengths within a predetermined wavelength interval.

The reflective surface or part of the reflective portion may be that of a main material of the housing, which may be moulded, such as injection moulded plastics, or shaped by bending a sheet of a material, such as a metal. The material may be polished or similarly treated to obtain a smooth surface, or the surface of the material may in itself be suitable. Also more rough surfaces will be able to reflect radiation.

Alternatively, a surface may be provided on the housing to provide the reflective portion. This reflective material or surface may be provided by providing a layer on the housing material, such as painting, CVD, deposition, or the like, or a layer of a material may be provided on the housing by soldering, gluing, welding or the like a layer of a material on to the housing.

Usually, the reflecting material is a solid material, either defining a reflecting surface or a reflecting material, such as a multilayer material. Interesting embodiments may be obtained using active, reflecting materials, such as vibrating crystals and liquids/surfaces, such as acousto-optical modulators, the reflection of which may be controlled.

When the connectors are positioned adjacently, light may be reflected from one reflective portion to the other in order to move toward and eventually through the opening.

Preferably, the opening is defined at outer portions of the reflective portions or of sides of the housings at or on which the reflective portions are defined or provided. From the opening, the light is preferably allowed to travel to or toward the surroundings of the communication element. Thus, the opening preferably is at or near an outer part of the communication element.

In many embodiments, the engagement portions are directed away from a main portion of the communication element, and the opening is provided between the engagement portions, so that the emitted light may be seen at the engagement portions.

Preferably, light may travel unobstructed between the reflecting portions and the opening, at least along a portion of the reflecting portions from a position of the light emitting element and to the opening.

Thus, preferably, no elements or only light transmissive elements are provided inside a space defined by outer contours of the reflective portions, from the opening and to a position of the light emitting element, if positioned between the reflective portions.

When the positions of the light emitting element, the opening and the reflecting portions areso, when projected on to a straight line, at least part of the reflecting portions are provided between the light emitting element and the opening, light emitted by the light emitting element and reflected by the reflecting portions is directed generally toward—or at least comes closer to—the opening.

Preferably, the reflective portions are parallel or at least substantially parallel, so that light reflected by a first reflective portion toward the other reflective portion may be reflected back toward the first reflective portion. Thus, the reflective portions may act as a wave or light guide from the light emitting element toward the opening.

In one embodiment, the communication connectors and the light emitting element are fixed to a support structure. A support structure of this type may be a Printed Circuit Board through which data to be interchanged via the connectors is also fed. Fixing the connectors to a common support is often desired for manufacturing purposes.

Preferably, the light emitting element is also fixed to the support structure. Due to the operation of the reflective portions, the light emitting element need not be positioned at the opening in order for the radiation or light to be visible.

In a preferred embodiment, the support structure has an outer boundary, and wherein the connectors extend from within the boundary to outside the boundary. Usually this boundary is in a plane of a major surface of the support structure, which normally is flat.

Often, the engagement portions are positioned in parts of the connectors extending outside the boundary.

In this situation, a covering may be provided having an opening for the connectors but preventing access from the outside to the support structure, so that the connectors may extend inside the openings or through the opening. The opening through which light is emitted thus is not covered.

In one embodiment, the reflecting portions each define a plane, which may be plane, straight or bent, where the light emitting element is positioned between the two planes. In this manner, light from the light emitting element is able to reach and be reflected by both reflecting portions. It does, however, suffice that light from the light emitting element is only able to reach one reflecting portion, and especially when light reflected by this reflecting portion is reflected toward or onto the other reflecting portion.

In one embodiment, the light emitting element is positioned between the two housings. A space is desired between the housings in order to form the path for the light from the light emitting element to the opening, so no real estate is wasted on e.g. the above support structure.

In the situation where the connectors extend beyond the boundary of the support structure, the light emitting element may be fixed to the support structure, while the light is guided to the opening by reflection also beyond the boundary of the support structure.

Another aspect of the invention relates to a method of operating the communication element according to the first aspect, the method comprising:
1) operating the light emitting element to emit light toward at least a first of the reflecting portions,
2) the first reflecting portion reflecting at least a first part of the emitted light,
3) emitting reflected light from the opening.

Usually, the step of controlling the light emitting element will simply be feeding the light emitting element with power. In some situations, the feeding will be controlled in order to control the wavelength or intensity of the light emitted.

The controlling of the light emitting element may depend on other factors, such as the receipt or transmission of data at/from one or both of the connectors. Thus, the intensity may be varied with a bandwidth or amount of data received/transmitted either using a simple threshold, so that light is emitted, if the bandwidth exceeds the threshold, and if not, no light is emitted. Alternatively, the intensity may vary with the bandwidth.

Also, a colour of the emitted light may vary with the bandwidth or the direction of the data, so that if the data is output, one colour is used, and another colour is used if the data is received. If data is both received and output, both colours may be emitted, or a colour may be selected depending on which bandwidth is the largest; the incoming or the outgoing.

The reflection of the light is determined by the relative positions of the light emitting element and the reflective portions. As mentioned above, the reflective portions may be controlled in order to control the direction of the reflected light.

The emission of the light from the opening may be light emitted directly from the light emitting element but it will usually also be of light reflected at least once by the reflecting portions.

In one embodiment, step 2) comprises the first reflecting portion reflecting the first part of the emitted light toward a second reflecting portion of the reflecting portions, the second reflecting portion reflecting at least a second part of the emitted light toward the opening.

In another embodiment, which may be combined with the above embodiment, step 2) comprises the first reflecting portion reflecting the first part of the emitted light toward a second reflecting portion of the reflecting portions, the second reflecting portion reflecting at least a second part of the emitted light toward the first reflecting portion.

In the following, preferred embodiments of the invention will be described with reference to the drawing, wherein.

Figure 1:
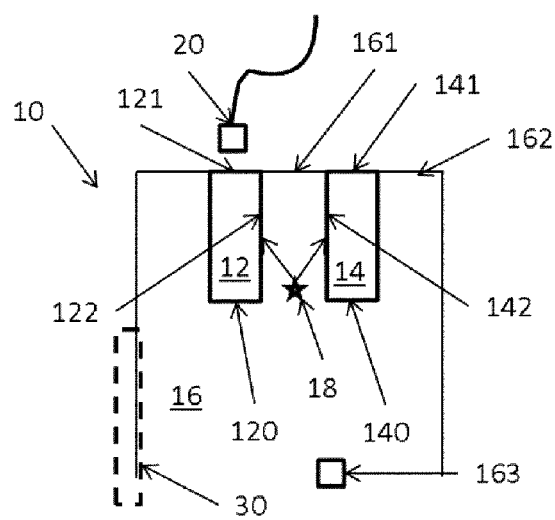
FIG. 1 illustrates a first embodiment according to the invention.

In FIG. 1, a communication card 10, such as a network card, of a computer or for use in a computer, such as a server, is illustrated. This network card 10 has two network or communication connections or connectors 12 and 14 which are each configured to engage with other network elements or connectors 20. These connectors may be of any type, such as RJ45 or gigabit Ethernet. Other connector types are USB, FireWire or the like.

In order to facilitate communication with the remainder of the PC or server (not illustrated), a connector 30, such as a PCMCIA connector or a PCI connector, may be provided. Cables with other types of connectors, such as RJ45, USB, FireWire or the like, may also be used. Alternatively, the connectors 12/14 may be provided directly in the computer, such as on the mother board thereof.

In this embodiment, the connectors 12/14 are fixed to a support structure 16, which normally would be a Printed Circuit Board (PCB) through which the data flowing to/from the connectors flows. Other electronic components 163, such as MACS, NICs, switching circuits, storage, processors, timing circuits or the like, may also be provided on the support structure or PCB 16 in order to take part in a processing of the data directed to/from the connectors 12/14.

Also provided is a radiation provider 18, such as a Light Emitting Diode (LED), laser diode, OLED, or the like, which is configured to emit visible radiation. Usually, radiation providers of this type are provided in the vicinity of communication connectors or plugs to illustrate whether data transport takes place. In many situations, different colours of radiation illustrate different types of data transport (receipt, transmission). A single radiation provider may emit different colours of radiation, or multiple radiation providers may be provided for each outputting one desired colour.

In this embodiment, the connector 12 has a housing 120, a side 122 of which is configured to reflect the radiation output by the radiation provider 18. In the same manner, the connector 14 has a housing 140, a side 142 of which reflects the radiation.

The reflecting sides may be provided on a non-reflecting material of the housings, or the housings may be made of reflecting materials. Often, housings are made of metal to also provide electromagnetic shielding. Metallic surfaces may be polished or have a more rough surface. Nevertheless, reflection may take place. Plastics surfaces may also themselves reflect radiation. If the housing surface in itself is not sufficiently reflecting, a reflecting surface may be added, such as by vapour deposition, welding, soldering, gluing, or the like.

When the radiation provider 18 is positioned so as to be able to launch radiation toward at least one of the sides 122/142, this radiation may be reflected toward and out from an opening 161 between the housings 120/140. Thus, the reflecting sides 122/142 act as a waveguide or light guide and transport radiation from the radiation provider 18 to the opening 161.

The size of the opening may be selected as desired. Often, the size of the opening, i.e. the height of the sides 122/142 and the distance there between, may be selected in dependence of the amount of radiation desired emitted per unit area from the opening, or the radiation provider may be selected or driven (fed/powered) in order to obtain the desired intensity.

Presently, a distance of 1-10 mm is preferred, such as a distance of 2-5 mm, such as a distance of 3-4 mm, such as around 3.15 mm is desired between the sides 122/142.

The radiation provider 18 preferably is also fixed to the PCB 16.

In general, different positions of the radiation provider 18 are possible. The most important feature is that the radiation should be able to enter the space between the sides 122/142, such as impinge on one of these sides.

Figure 2:
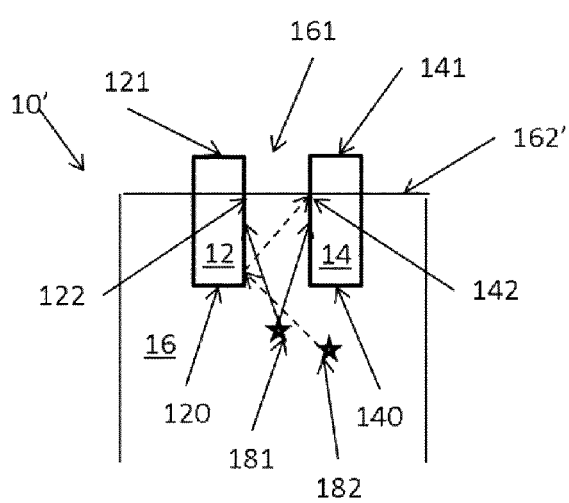
FIG. 2 illustrates another embodiment according to the invention.

In FIG. 1, the radiation provider 18 is positioned directly between the sides 122/142. In FIG. 2, two other positions 181/182 are illustrated which will also provide radiation toward the sides 122/142 and out through the opening 161.

In FIG. 1, an end portion or outer boundary portion 162 of the PCB 16 is positioned at the ends of the connectors 12/14. In FIG. 2, this boundary portion 162' has been retracted, so that the connectors 12/14 extend beyond the boundary. However, due to the reflection, the light will still reach the opening 161, which now is positioned on the outside of the boundary 162'.

In general, the radiation provider 18 may be controlled, such as by the electronics 163, to output an intensity and/or a colour depending from parameters of the overall card 10, such as an amount or bandwidth of data received by one or both of the connectors 12/14 or a direction of the data (inbound or outbound), as well as whether an error condition has been identified.

The intensity thus may be controlled to reflect a bandwidth of inbound/outbound data, and the colour the direction thereof and/or that an error state has been identified.

The invention claimed is:

1. A communication element (10, 10') comprising a support structure (16), two communication connectors (12, 14) and a light emitting element, wherein:
    each communication connector comprises a housing (120, 140) having a radiation reflecting portion (122, 142) and an engagement portion configured to engage a communication element (20),
    the communication connectors are fixed to the support structure and are positioned adjacent to each other with the reflecting portions facing each other and defining there between an opening (161), the support structure having an outer boundary (162, 162'), and wherein the connectors extend from within the boundary to outside the boundary or wherein the boundary is positioned at ends of the connectors, the light emitting element fixed to the support structure and being positioned so as to be able to emit radiation toward at least a portion of one of the reflecting portions and toward the opening, the positions of the light emitting element (18), the opening and the reflecting portions being so, when projected on to a straight line, at least part of the reflecting portions are provided between the light emitting element and the opening.

2. A communication element according to claim 1, wherein the reflecting portions each define a plane, where the light emitting element is positioned between the two planes.

3. A communication element according to claim 1, wherein the light emitting element is positioned between the two housings.

4. A method of operating the communication element according to claim 1, the method comprising:

1) operating the light emitting element to emit light toward at least a first of the reflecting portions, 2) the first reflecting portion reflecting at least a first part of the emitted light, 3) emitting reflected light from the opening.

5. A method according to claim 4, wherein step 2) comprises the first reflecting portion reflecting the first part of the emitted light toward a second reflecting portion of the reflecting portions, the second reflecting portion reflecting at least a second part of the emitted light toward the opening.

6. A method according to claim 4, wherein step 2) comprises the first reflecting portion reflecting the first part of the emitted light toward a second reflecting portion of the reflecting portions, the second reflecting portion reflecting at least a second part of the emitted light toward the first reflecting portion.

* * * * *